United States Patent [19]
Glance

[11] Patent Number: 5,526,153
[45] Date of Patent: Jun. 11, 1996

[54] OPTICAL CHANNEL ADDING/DROPPING FILTER

[75] Inventor: Bernard Glance, Colts Neck, N.J.

[73] Assignee: AT&T Corp., Murray Hill, N.J.

[21] Appl. No.: 184,165

[22] Filed: Jan. 21, 1994

[51] Int. Cl.[6] .................................. H04J 14/02
[52] U.S. Cl. .................................. 359/127
[58] Field of Search .................. 359/123, 124, 359/127, 128, 130, 589, 618, 634, 587, 885, 887; 385/24

[56] References Cited

U.S. PATENT DOCUMENTS

| | | | |
|---|---|---|---|
| 3,720,887 | 3/1973 | Matthews | 331/110 |
| 4,673,270 | 6/1987 | Gordon | 359/115 |
| 5,002,350 | 3/1991 | Dragone | 350/96 |
| 5,136,671 | 4/1992 | Dragone | 385/46 |
| 5,245,690 | 9/1993 | Aida | 385/142 |
| 5,283,845 | 2/1994 | Ip | 359/118 |
| 5,327,276 | 7/1994 | Shimosaka | 359/125 |
| 5,402,256 | 3/1995 | Spanke | 359/139 |

FOREIGN PATENT DOCUMENTS 0034569  3/1980  Japan .................................. 359/127

OTHER PUBLICATIONS

Co-pending U.S. patent application Ser. No. 08/019,961, B. Glance et al. Case 22–2.
Co-pending U.S. patent application Ser. No. 08/019,957, B. Glance et al. Case 23–3.
Co-pending U.S. patent application Ser. No. 08/019,951, G. Blance et al. Case 24–4.
Co-pending U.S. patent application Ser. No. 08/019,952, Corrado Dragone et al. Case 34–41.
Co-pending U.S. patent application Ser. No. 08/138,659, B. Glance et al. Case 27–7.

*Primary Examiner*—Leslie Pascal
*Attorney, Agent, or Firm*—Stuart H. Mayer

[57] ABSTRACT

An optical filter is formed from an optical frequency routing device having N inputs and N outputs, where N>1. A plurality of waveguides each couple one of the outputs to one of the inputs of the frequency routing device in a consecutive order to form a series of optically transmissive feedback loops. As a result of this arrangement, an input signal composed of a plurality of multiplexed optical frequencies directed to an input of the routing device is first demultiplexed to yield a sequence of demultiplexed frequency components which are directed to the outputs of the routing device. The demultiplexed frequencies may be rerouted back to the inputs of the routing device via the optical feedback loops between the outputs and the inputs. A remaining output that is not incorporated into one of the feedback loops is provided for receiving the resulting multiplexed output signal. Rather than rerouting the demultiplexed frequency components back through the routing device via optical loops, one or more of the loops may be opened up to either drop, add, or drop and add a frequency component.

14 Claims, 4 Drawing Sheets

OPTICAL CHANNEL ADDING/DROPPING FILTER

CROSS-REFERENCE TO RELATED APPLICATIONS

This application is related to U.S. application Ser. No. 08/019,961 filed with the United States Patent and Trademark Office on Feb. 19, 1993, entitled "Rapidly Tunable Integrated Optical Filter".

This application is related to U.S. application Ser. No. 08/019,957 filed with the United States Patent and Trademark Office on Feb. 19, 1993, entitled "Rapidly Tunable Wideband Integrated Optical Filter".

This application is related to U.S. application Ser. No. 08/019,951 filed with the United States Patent and Trademark Office on Feb. 19, 1993, entitled "Rapidly Tunable Wideband Integrated Laser".

This application is related to U.S. application Ser. No. 08/019,952 filed with the United States Patent and Trademark Office on Feb. 19, 1993, entitled "Rapidly Tunable Integrated Laser".

This application is related to U.S. application Ser. No. 08/138,659 filed with the United States Patent and Trademark Office on Oct. 18, 1993, entitled "Optical Passband Filter".

TECHNICAL FIELD

This invention relates to optical communications systems. More particularly, this invention relates to optical channel adding/dropping filters used in optical communications systems.

BACKGROUND

The capacity and speed of communications systems may be increased by transmitting information in optical form over networks composed of optically transmissive nodes, fibers, and the like. High capacity optical communications systems require that many optical signals be frequency division multiplexed in the components of an optical network. Receivers must be configured such that a desired optical frequency or band of frequencies may be retrieved from a group of many optical frequencies. This necessitates the provision of suitable optical filters such as an optical channel adding/dropping filter for dropping a frequency component from a multiplexed signal composed of a large number of frequencies or, alternatively, substituting a frequency component that has the same carrier frequency as the original component but a different modulation. While U.S. Pat. No. 5,461,685 discloses an optical filter that employs two frequency routing devices, until now there has been no convenient approach to filtering the individual components from a multiplexed series of optical frequencies with only a single frequency routing device.

SUMMARY

In accordance with this invention, an optical channel adding/dropping filter has been developed. The optical filter in accordance with this invention may be based upon photonic integrated circuitry which can provide a very sharp transition between the various passbands which can be realized at a cost lower than that associated with implementing prior optical filters.

In one example of the invention, Applicants have realized that a single integrated optical multiplexer/demultiplexer disclosed, for example, in U.S. Pat. Nos. 5,002,350 and 5,136,671 may be used to create a monolithic optical channel adding/dropping filter. In specific terms, this example of the invention comprises an optical frequency routing device having N inputs and N outputs, where N>1. A plurality of waveguides each couple one of the outputs to one of the inputs of the frequency routing device in a consecutive order to form a series of optically transmissive feedback loops.

As a result of this arrangement, an input signal composed of a plurality of multiplexed optical frequencies directed to an input of the routing device is first demultiplexed to yield a sequence of demultiplexed frequency components which are directed to the outputs of the routing device. The demultiplexed frequencies may be rerouted back to the inputs of the routing device via the optical feedback loops between the outputs and the inputs. A remaining output that is not incorporated into one of the feedback loops is provided for receiving the resulting multiplexed output signal. Rather than rerouting the demultiplexed frequency components back through the routing device via optical loops, one or more of the loops may be opened up to either drop, add, or drop and add a frequency component. If a preselected frequency component or components is prevented from returning to the input of the routing device by opening its corresponding loop, this frequency component can be dropped so that the resulting multiplexed output signal corresponds to the input signal except that one frequency component has been removed. Similarly, rather than removing the frequency component, it may be replaced by another frequency component which has the same carrier frequency but which contains a different modulated signal. Additionally, a frequency component absent from the input signal may be added to the resulting multiplexed output signal.

In one particular example of the invention, the N×N frequency routing device is provided with N−1 waveguides that couple N−1 outputs of the outputs to N−1 of the inputs. A first end of the waveguides is coupled to the respective outputs in a sequential order and a second end of the waveguides is coupled to the respective inputs in a sequential order opposite to the sequential order of the first ends.

This is only an example of the invention. The full scope of the invention entitled to an exclusionary right is set forth in the claims at the end of this application.

DETAILED DESCRIPTION

Figure 1:
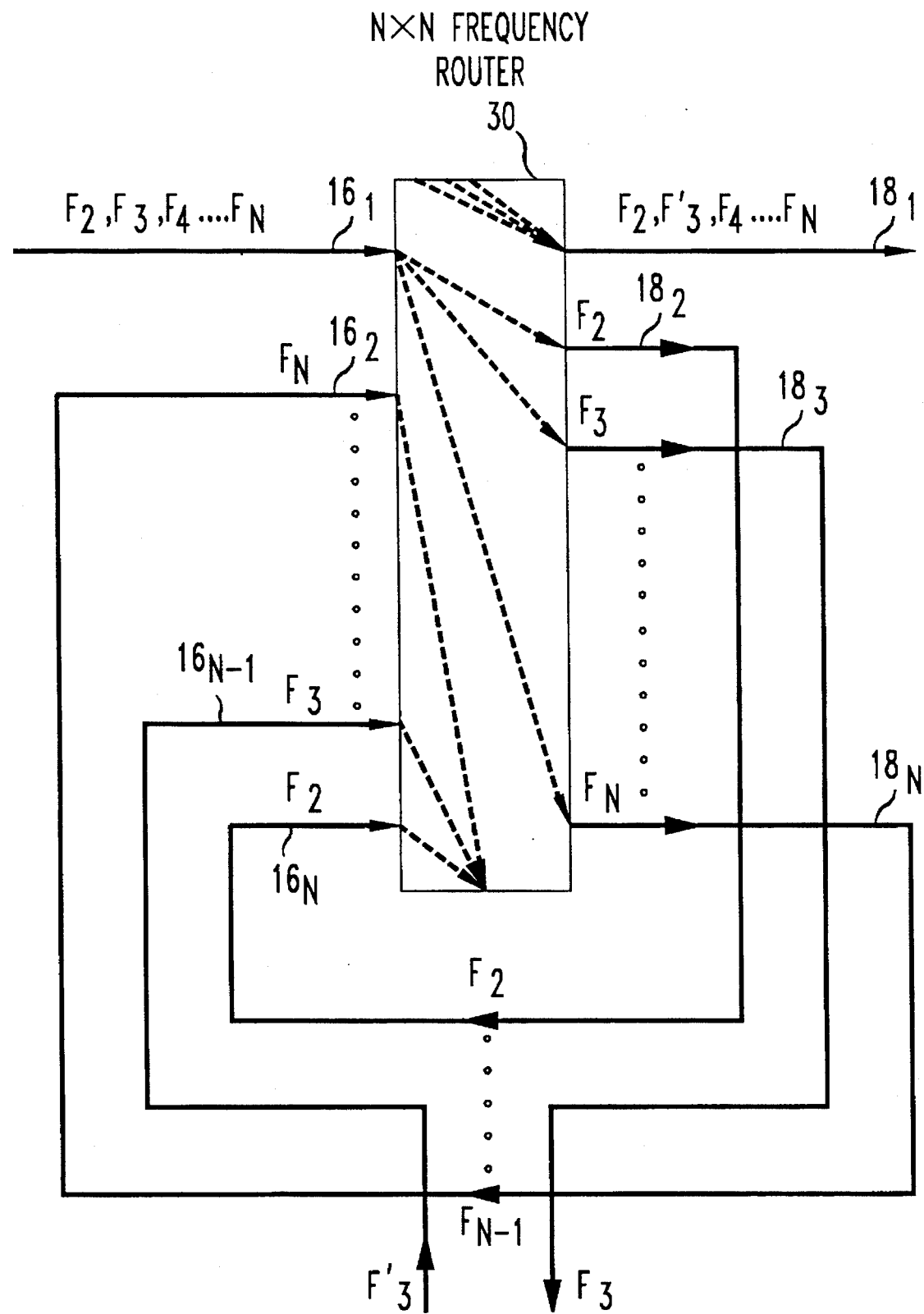
FIG. 1 is a diagram of an example of an optical channel adding/dropping filter in accordance with this invention.

FIG. 1 shows an example of the optical channel adding/dropping filter of the present invention. It is composed of one frequency routing device 30 and a plurality of waveguides. These structures may be monolithically integrated on a semiconductive wafer and they may be created by known photolithographic techniques.

The frequency routing devices employed in the present invention operate as multiplexers and demultiplexers of optical frequencies. The details of their construction and operation are more fully described in U.S. Pat. Nos. 5,002,350 and 5,136,671 to Dragone, the entire contents of which are hereby incorporated by reference into this application. Before the optical passband filter of the present invention is described, the pertinent features of the frequency routing devices will be reviewed.

FIGS. 2(a) and (b) show a functional illustration of a routing device 12 of the type employed in the present invention. In general, the routing device may have N input waveguides and M output waveguides to form an N×M frequency routing device. For example, the routing device 12 shown in FIG. 2(a) has four input waveguides $16_1$, $16_2$, $16_3$, $16_4$, and four output waveguides $18_1$, $18_2$, $18_3$, $18_4$. In general, for a frequency routing device of a given design, the output waveguide to which a particular frequency component will be directed is a function of the frequency and the particular input waveguide to which the frequency component is directed. The routing device 12 can be configured to demultiplex preselected input optical frequencies directed to any of its input waveguides. For example, as seen in FIG. 2(a), if a multiplexed signal composed of preselected frequencies $F_1$, $F_2$, $F_3$, $F_4$, is directed to the first input waveguide $16_1$ of the routing device 12, frequency $F_1$ will be directed to output waveguide $18_1$, frequency $F_2$ will be directed to output waveguide $18_2$, frequency $F_2$ will be directed to output waveguide $18_3$, and frequency $F_4$ will be directed to output waveguide $18_4$. The details of constructing an appropriate frequency routing device for demultiplexing and multiplexing a series of preselected frequency components is disclosed in the above-referenced patents.

FIG. 2(b) illustrates the manner in which the optical signal is demultiplexed by the frequency routing device seen in FIG. 2(a) if it is directed to the second input waveguide $16_2$ rather than the first input waveguide $16_1$. In this case frequency $F_1$ will be directed to output waveguide $18_2$, frequency $F_2$ will be directed to output waveguide $18_3$, frequency $F_3$ will be directed to output waveguide $18_4$, and frequency $F_4$ will be directed back up to output waveguide $18_1$ since the routing device 12 only has four output waveguides. If the routing device 12 is provided with a fifth output waveguide $18_5$ (shown in dashed lines in FIG. 2(b)) to form a 4×5 routing device, frequency $F_4$ will appear on this fifth output waveguide instead of on the first output waveguide $18_1$.

The routing devices discussed above are symmetrical in operation. Therefore, if in connection with the routing device shown in FIG. 2(a) frequencies $F_1$, $F_2$, $F_3$, $F_4$ are directed to waveguides $18_1$, $18_2$, $18_4$, and $18_5$, respectively (which now function as input waveguides), frequencies $F_1$ and $F_2$ will be output on waveguide $16_1$ and frequencies $F_3$ and $F_4$ will be output on waveguide $16_2$.

Figure 2:
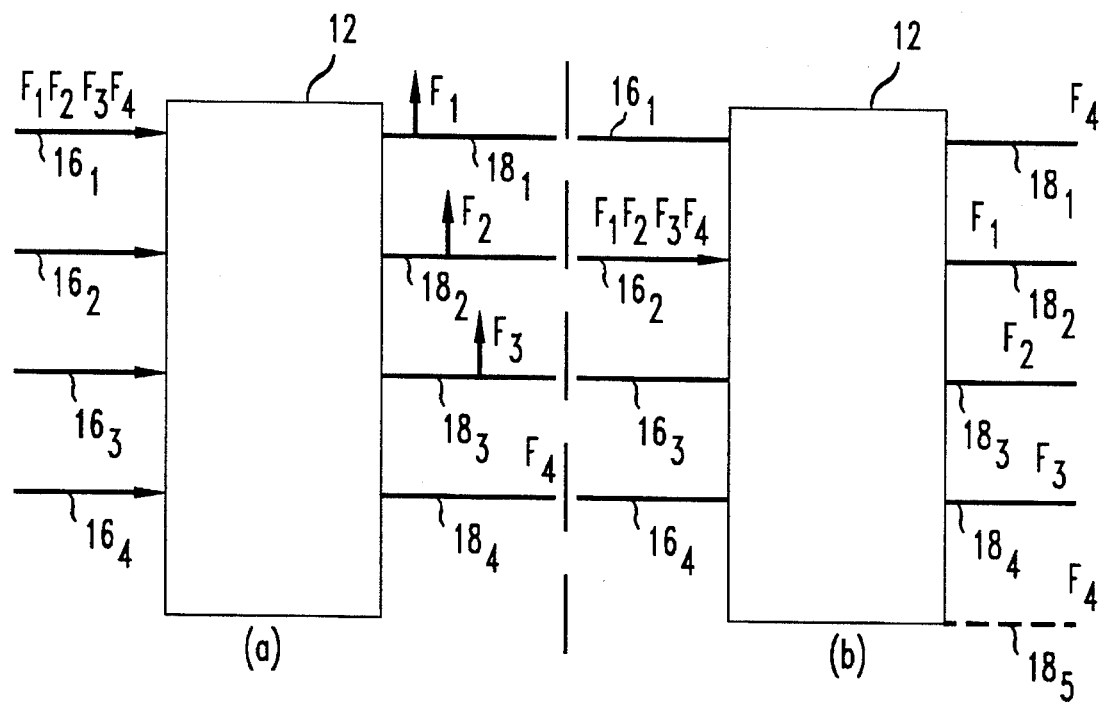
FIGS. 2(a) and 2(b) are diagrams of the frequency routing device employed in the optical filter of this invention.

A general property of the frequency routing device seen in FIG. 2, which is configured to demultiplex and multiplex a given set of frequency components, is suggested by FIGS. 1 and 2. Specifically, if an optical signal is directed to any selected input waveguide $16_i$, the first frequency component of the signal will appear on output waveguide $18_i$, the second frequency component will appear on output waveguide $18_{(i+1)}$, the third frequency component will appear on output waveguide $18_{(i+2)}$, etc. Alternatively, the frequency routing device may be configured so that the first frequency component appears on output waveguide $18_{(i+1)}$ rather than output waveguide $18_i$, in which case all the subsequent frequency components will be shifted by one output waveguide relative to the waveguide they would appear on if the first frequency component was directed to output waveguide $18_i$. After a given frequency component is directed to the last output waveguide (i.e., the Nth output waveguide), the next frequency component will be directed back up to the first output waveguide, as seen, for example, in the case of frequency $F_4$ of FIG. 2(b). In other words, the N output waveguides may be considered a repeating series of waveguides having a period N, where, for example, the ith output waveguide serves not only as the ith output waveguide, but also as the(i+N)th output waveguide. The invention employs this property of the frequency routing device in the manner described below.

Referring again to FIG. 1, the N×N frequency routing device 30 of the invention has an input $16_1$ on which is directed an input signal composed of (N–1) individual frequency components. In contrast to the frequency routing device shown in FIG. 2, this frequency routing device is preconfigured to direct the first frequency to the second output waveguide $18_2$ and not the first output waveguide $18_1$ as in FIG. 2(a). Accordingly, for the sake of clarity, the first frequency component of the signal will be designated $F_2$ and not $F_1$. The subsequent frequency components will be designated, as usual, $F_3$, $F_4$, . . . $F_N$, respectively.

The invention employs the frequency routing device 30 to form an optical filter by coupling the output waveguides back to the input waveguides in the manner shown in FIG. 1. In particular, beginning with the second output waveguide $18_2$, a series of optically transmissive feedback loops are formed by coupling the output waveguides $18_2$, $18_3$, . . . , $18_N$ to a respective input waveguide $16_2$, $16_3$, . . . , $16_N$ in a sequential order opposite to the sequential order in which the output waveguides are arranged. As seen in FIG. 1, output waveguide $18_2$ is coupled to the input waveguide $16_N$, output waveguide $18_3$ is coupled to input waveguide $16_{(N-1)}$, etc. Finally, output waveguide $18_N$ is coupled to input waveguide $16_2$. Output waveguide $18_1$ does not enter into a feedback loop so as to serve as an output for the resulting output signal.

The optical filter formed by coupling the outputs of a frequency routing device back to the inputs in the manner described above processes a multiplexed input signal as follows. First, the input signal is demultiplexed in accordance with the operation of the routing device shown in FIG. 2(a) so that frequency component $F_2$ is directed from the input waveguide $16_1$ to output waveguide $18_2$, frequency component $F_3$ is directed from the input waveguide $16_1$ to output waveguide $18_3$, etc. As a result of the coupling arrangement between the output waveguides and the input waveguides, the individual frequency components are fedback to the input waveguides in a sequential order that is opposite relative to the order in which they were output. Specifically, frequency $F_2$ is directed to input waveguide $16_N$, frequency $F_3$ is directed to input waveguide $16_{(N-1)}$, and so on, until finally, frequency $F_N$ is fedback to input waveguide $16_2$.

These demultiplexed frequency components are next rerouted through the frequency routing device in accordance with the above-mentioned general property of a frequency routing device that is properly configured to serve as a multiplexer or demultiplexer (i.e., for an optical signal directed to any selected input waveguide $16_i$, the second frequency component $F_2$ will appear on output waveguide $18_{i+1}$), the third frequency component $F_3$ will appear on output waveguide $18_{i+2}$), etc.). Accordingly, since in the case of frequency component $F_2$, i=N (i.e., frequency component $F_2$ is input to input waveguide $16_N$), frequency $F_2$ is directed to the output waveguide corresponding to i+1=N+1, which in this case is output waveguide $18_1$. Similarly, since for frequency component $F_3$, i=N−1 (i.e., frequency component $F_3$ is input to input waveguide $16_{(N-1)}$, frequency $F_3$ is directed to the output waveguide corresponding to i+2= N+1, which in this case is again output waveguide $18_1$. This process continues in a similar manner for each frequency component until finally, frequency component $F_N$, for which i=2, is directed to the output waveguide corresponding to i=i+(N−1)=N+1, which once again corresponds to output waveguide $18_1$. Accordingly, all the frequency components of the input signal will be directed to output waveguide $18_1$.

As described to this point, the optical filter of the invention simply routes a multiplexed input signal to a preselected output waveguide such as output waveguide $18_1$ in the example of the invention shown in FIG. 1. In order to employ the device as a filter, one or more of the waveguide loops coupling the output waveguides back to the input waveguides must be opened up to either drop or add a frequency component. For example, in FIG. 1 the loop directing frequency component $F_3$ from the output back to the input of routing device 30 is opened at an arbitrary point. If desired, by simply preventing frequency component $F_3$ from returning to the input of the routing device this frequency component can be dropped so that it does not appear on the output waveguide $18_1$ and hence the multiplexed output signal corresponds to the input signal except that one frequency component has been removed. Similarly, rather than removing frequency component $F_3$, it may be replaced by frequency component $F_3$, which has the same carrier frequency as $F_3$ but may contain a different modulated signal. Additionally, if a frequency component were absent from the input signal it may be added to the resulting multiplexed output signal.

Figure 3:
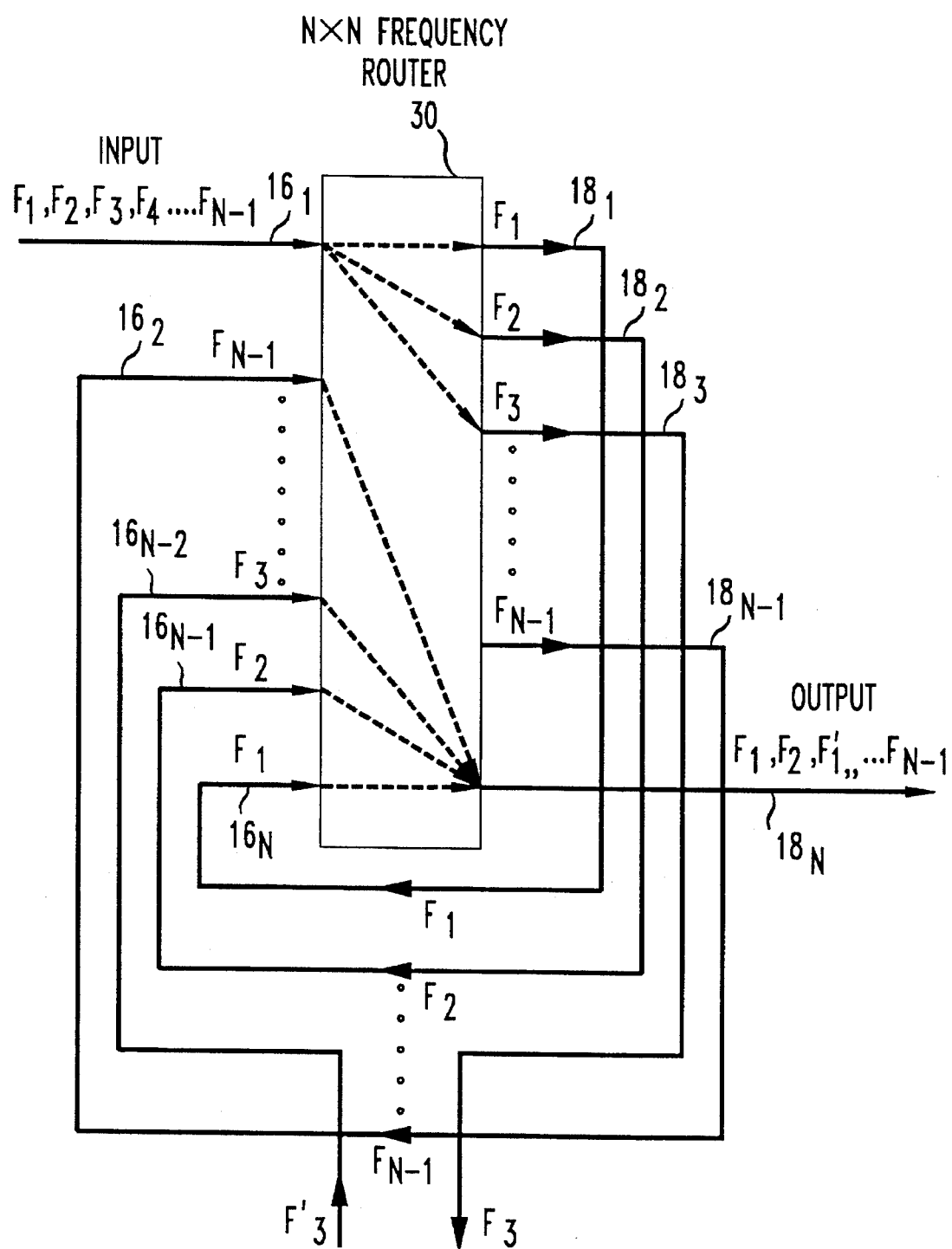
FIG. 3 is a diagram of an alternative example of an optical channel adding/dropping filter in accordance with this invention.

FIG. 3 shows another example of the invention in which the rerouted multiplexed signal is directed to output waveguide $18_N$ rather than output waveguide $18_1$ as in the first example of the invention shown in FIG. 1. In this case the first output waveguide $18_1$ is coupled to the last input waveguide $16_N$ (in FIG. 1 the second output waveguide $18_2$ was coupled to the last input waveguide $16_N$). The subsequent output waveguides $18_2, 18_3, \ldots 18_{(N-1)}$ are coupled to the input waveguides in sequential order similar to the configuration in FIG. 1. Output waveguide $18_N$ does not form a feedback loop so that it may serve as the output waveguide for the resulting output multiplexed signal. As a consequence of this arrangement the input multiplexed signal will be directed to output waveguide $18_N$. One or more of the waveguides $18_1, 18_2, \ldots, 18_{(N-1)}$ may be opened to add or drop a frequency component in the same manner discussed in connection with the first example of the invention.

One skilled in the art will recognize that the examples of the invention described herein can be generalized to direct the input signal to any desired output of the frequency routing device by choosing a suitable arrangement for the optical feedback loop between the outputs and the inputs of the routing device.

Figure 4:
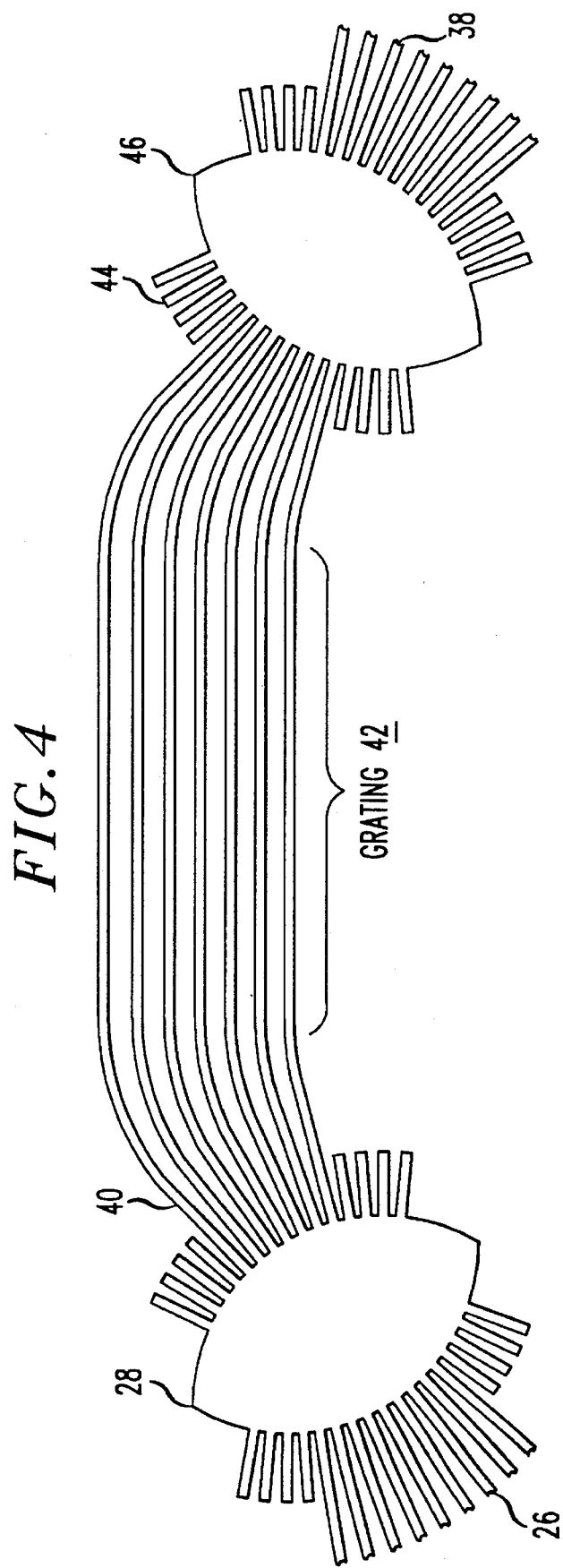
FIG. 4 is a diagram illustrating the details of the frequency routing devices shown in FIG. 1.

FIG. 4 shows the pertinent details of the frequency routing device employed in the filter of the invention. Each frequency routing device contains a plurality of input waveguides 26 connected to a free space region 28. A plurality of output waveguides 40 extends from the free space region 28 and is connected to an optical grating 42. The optical grating 42 comprises a plurality of unequal length waveguides which provides a predetermined amount of path length difference to a corresponding plurality of input waveguides 44 connected to another free space region 46. The free space region 46 is connected to a plurality of output waveguides 38. These frequency routing devices operate as multiplexers and demultiplexers of optical frequencies. As noted above, details of their construction and operation are more fully described in the U.S. Pat. Nos. 5,002,350 and 5,136,671 to Dragone. In the case of the frequency routing device seen in FIG. 1, the input waveguides $16_1, 16_2, \ldots, 16_N$ correspond to the input waveguides 26 shown in FIG. 4 and the output waveguides $18_1, 18_2, \ldots, 18_N$ correspond to output waveguide 38.

I claim:

1. An optical filter comprising:
   an optical frequency routing device for demultiplexing an optical signal composed of a plurality of multiplexed optical frequencies to produce demultiplexed frequency components, said frequency routing device having a plurality of inputs and outputs; and
   means for directing at least some of the demultiplexed frequency components to respective inputs of the frequency routing device such that the directed frequency components are multiplexed on a preselected output of the frequency routing device.

2. The filter of claim 1 wherein the directing means comprises means for directing the demultiplexed frequency components to the inputs in a sequential order opposite to a sequential order in which the demultiplexed frequency components are initially output.

3. The filter of claim 1 wherein the directing means comprises means for dropping at least one demultiplexed frequency component and means for adding to an input of the frequency routing device a frequency component corresponding to a frequency component absent from the optical signal.

4. The filter of claim 3 wherein the directing means comprises means for directing the demultiplexed frequency components to the inputs in a sequential order opposite to a sequential order in which the demultiplexed frequency components are initially output.

5. The filter of claim 4 wherein the means for dropping at least one of the demultiplexed frequency components comprises means for dropping the frequency components and substituting therefore other frequency components each having a carrier frequency substantially equal to, and a modulation different from, those of the respective carrier frequencies of the demultiplexed frequency components.

6. The filter of claim 3 wherein the means for dropping at least one of the demultiplexed frequency components comprises means for dropping the frequency components and substituting therefore other frequency components each having a carrier frequency substantially equal to, and a modulation different from, those of the respective carrier frequencies of the demultiplexed frequency components.

7. A method of filtering an optical signal composed of a plurality of multiplexed optical frequencies, said method comprising the steps of:
   directing the optical signal to one of a plurality of inputs of an optical frequency routing device;
   demultiplexing the signal with an optical frequency routing device to produce a plurality of demultiplexed frequency components; and
   directing the demultiplexed frequency components to respective inputs of the frequency routing device such that the frequency components are multiplexed on a preselected output of the frequency routing device.

8. The filter of claim 7 wherein the step of directing the demultiplexed frequency comprises the steps of dropping at least one of the demultiplexed frequency components and selectively adding to an input of the frequency routing device a frequency component corresponding to a frequency component absent from the optical signal.

9. The method of claim 8 wherein the step of dropping at least one of the demultiplexed frequency components comprises the step of dropping the frequency components and substituting therefore other frequency components each having a carrier frequency substantially equal to, and a modulation different from, those of the respective carrier frequencies of the demultiplexed frequency components.

10. The method of claim 7 wherein the step of demultiplexing the signal includes the step of directing the demultiplexed frequency components to respective outputs of the frequency routing device in a sequential order and wherein the step of directing the demultiplexed frequency components to the inputs includes the step of directing the demultiplexed frequency components to the inputs in a sequential order opposite to the sequential order in which the demultiplexed frequency components are output.

11. The method of claim 8 wherein the step of dropping at least one of the demultiplexed frequency components comprises the step of selectively dropping the frequency components and substituting therefore other frequency components each having a carrier frequency substantially equal to, and a modulation different from, those of the respective carrier frequencies of the demultiplexed frequency components.

12. An optical filter comprising:

an optical frequency routing device having N inputs and N outputs, N>1; and a plurality of waveguides each coupling one of the outputs to one of the inputs of the frequency routing device in a consecutive order such that a remaining output not coupled to one of the waveguides is adapted for receiving a multiplexed output signal having no more that N−1 frequency components and wherein at least one remaining input is adapted for receiving a multiplexed input signal.

13. The filter of claim 12 wherein said plurality of waveguides comprises N−1 waveguides coupling N−1 outputs to N−1 inputs.

14. The filter of claim 13 wherein a first end of the waveguides is coupled to the respective outputs in a sequential order and wherein a second end of the waveguides is coupled to the respective inputs in a sequential order opposite to the sequential order of the first ends.

\* \* \* \* \*